(12) United States Patent
Yamada et al.

(10) Patent No.: US 6,303,055 B1
(45) Date of Patent: Oct. 16, 2001

(54) COMPOSITION OF A HIGH SENSITIVITY SENSOR FOR DETECTING MECHANICAL QUANTITY

(75) Inventors: Katsunori Yamada; Mitsuru Asai; Nobuo Kamiya, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/232,906

(22) Filed: Jan. 19, 1999

(30) Foreign Application Priority Data

Jan. 16, 1998 (JP) .................................................. 10-020275

(51) Int. Cl.$^7$ .............................. H01B 1/08; G01B 7/16; G01L 1/00
(52) U.S. Cl. ........................ 252/516; 252/521.4; 252/515; 252/518.1; 73/763; 73/777
(58) Field of Search ..................................... 252/516, 515, 252/518.1, 521.4, 521.5; 264/57, 61, 104; 73/763, 777

(56) References Cited

U.S. PATENT DOCUMENTS

| | | |
|---|---|---|
| 4,203,088 | 5/1980 | Sado et al. . |
| 4,793,193 | 12/1988 | Borgudd . |
| 5,645,929 | * 7/1997 | Debe ..................................... 428/323 |
| 5,656,218 | * 8/1997 | Lin et al. .................................. 59/89 |
| 5,835,841 | 11/1998 | Yamada et al. . |
| 6,143,207 | * 11/2000 | Yamada et al. .................... 252/515.1 |

FOREIGN PATENT DOCUMENTS

| | | |
|---|---|---|
| 60-18081 | 5/1985 | (JP) . |
| 1-252582 | 10/1989 | (JP) . |
| 2-229765 | 9/1990 | (JP) . |

* cited by examiner

Primary Examiner—Mark Kopec
(74) Attorney, Agent, or Firm—Oblon, Spivak, McClelland, Maier & Neustadt, P.C.

(57) ABSTRACT

A composition of a high sensitivity sensor for detecting mechanical quantity including: an insulating matrix material; and a conductive path formed by discontinuously dispersing second phase particles of a conductor or a semiconductor into the insulating matrix material at an interparticle distance from 0.001 to 1 μm, thereby imparting the high sensitivity in the mechanical quantity to the composition.

9 Claims, 3 Drawing Sheets

COMPOSITION OF A HIGH SENSITIVITY SENSOR FOR DETECTING MECHANICAL QUANTITY

BACKGROUND OF THE INVENTION

1. Field of the Invention

The present invention relates to a composition of a high sensitivity sensor for detecting mechanical quantity of force, pressure, torque, speed, acceleration, position, displacement, impact force, weight mass, vacuum degree, rotating force, vibration, noise, etc. with high sensitivity.

2. Description of Related Art

An electrical resistance strain gauge, silicon of a semiconductor, etc. are conventionally used as a component of a sensor for detecting mechanical changing amounts of force, pressure, torque, speed, acceleration, position, displacement, impact force, weight mass, vacuum degree, rotating force, vibration, noise, etc. through strain (stress).

In particular, the semiconductor silicon is applied to an impact tester, a displacement gauge, a pressure converter, an accelerometer, a compact pressure gauge for an organism, a flow meter, a gas pressure gauge, etc. as a strain gauge element of high sensitivity in various fields such as general industry, automobiles, medical care, etc.

Silicon (Si) is generally used as a sensor for detecting mechanical quantity using the semiconductor. A phenomenon in which an electrical resistance value of the semiconductor is changed by strain caused by applying external force to the silicon is used.

However, because of the lower sensitivity of the sensor constituted of a conventional material, it is difficult to obtain a sensor for detecting mechanical quantity having a required accuracy and high sensitivity which are used as a micro pressure sensor of an organismic system, etc., a combustion pressure sensor and a pressure sensor for a hydraulic device.

SUMMARY OF THE INVENTION

In consideration of such problems, the object and an aspect of the present invention is to provide a composition of a high sensitivity sensor for detecting mechanical quantity in which a sensor capable of detecting a mechanical quantity can be constructed with a high sensitivity (high gauge ratio).

Next, a second aspect of the invention is a composition of a high sensitivity sensor for detecting mechanical quantity comprising:

an insulating matrix material;
a conductive path formed by discontinuously dispersing second phase particles of a conductor or a semiconductor into the insulating matrix material at an interparticle distance from 0.001 to 1 $\mu$m;
wherein an average distance A between the second phase particles parallel to a loading direction of mechanical quantity to be detected is smaller than an average distance B between the second phase particles perpendicular to the loading direction;
thereby imparting the high sensitivity in the mechanical quantity to the composition.

The composition of a high sensitivity sensor for detecting mechanical quantity in the second aspect of the invention comprises the insulating matrix material and the conductive path which is constituted of discontinuously dispersing the second phase particles into this insulating matrix material at the interparticle distance from 0.001 to 1 $\mu$m.

In this composition of a high sensitivity sensor for detecting mechanical quantity, the average distance A between the second phase particles in the loading direction of the detected mechanical quantity is smaller than the average distance B between the second phase particles in the direction perpendicular to the loading direction. Accordingly, a large electrical resistance changing rate can be also obtained with respect to a small strain although its detailed mechanism is yet unclear. Therefore, strain-electrical resistance effects with high sensitivity can be obtained. Therefore, it has become clear that a gauge ratio is greatly increased in comparison with the conventional material.

Therefore, sensitivity of the sensor for detecting mechanical quantity manufactured by the composition of the sensor in the second aspect of the invention is greatly improved. Accordingly, a sensor for detecting mechanical quantity with a high accuracy can be obtained.

As mentioned above, in accordance with the second aspect of the invention, it is possible to provide a composition of a high sensitivity sensor for detecting mechanical quantity capable of constituting a sensor capable of detecting the mechanical quantity with high sensitivity.

Next, a third aspect of the invention is a composition of a high sensitivity sensor for detecting mechanical quantity comprising:

an insulating matrix material;
a conductive path formed by discontinuously dispersing second phase particles of a conductor or a semiconductor into the insulating matrix material at an interparticle distance from 0.001 to 1 $\mu$m;
wherein the insulating matrix comprises crystal particles which are oriented and aligned in a loading direction of mechanical quantity to be detected;
thereby imparting the high sensitivity in the mechanical quantity to the composition.

The composition of a high sensitivity sensor for detecting mechanical quantity in the third aspect of the invention comprises the insulating matrix material and the conductive path which is constituted of discontinuously dispersing the second phase particles into this insulating matrix material at the interparticle distance from 0.001 to 1 $\mu$m.

This composition of a high sensitivity sensor for detecting mechanical quantity is in a state in which the crystal particles constituting the above insulating matrix are oriented along the loading direction of the detected mechanical quantity. In other words, an anisotropic property is given to a dispersion mode of the second phase particles.

Accordingly, the distance between the second phase particles in the loading direction of the detected mechanical quantity can be set to be smaller than that in a direction perpendicular to the loading direction although its detailed mechanism is unclear.

Further, a change in the interparticle distance in the loading direction caused by a stress load can be increased in comparison with that in the direction perpendicular to the loading direction. Namely, a change in electrical resistance value in the stress loading direction can be set to be larger than that in the direction perpendicular to the stress loading direction.

Thus, a large electrical resistance changing rate can be also obtained with respect to a small strain and strain-electrical resistance effects with a high sensitivity can be obtained. Accordingly, it has become clear that a gauge ratio is greatly increased in comparison with the conventional material.

Therefore, sensitivity of the sensor for detecting mechanical quantity manufactured by the composition of the sensor in the third aspect of the invention is greatly improved. Accordingly, a sensor for detecting mechanical quantity with a high accuracy can be obtained.

As mentioned above, in accordance with the third aspect of the invention, it is possible to provide a composition of a high sensitivity sensor for detecting mechanical quantity capable of constituting a sensor capable of detecting the mechanical quantity with a high sensitivity.

Figure 1A:
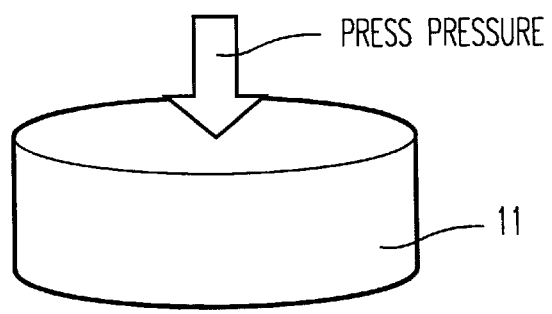
FIGS. 1A, 1B and 1C are explanatory views showing one process of the producing methods of Samples 1 to 6 in accordance with Embodiment 1.

DETAILED DESCRIPTION OF THE INVENTION (First Aspect of the Invention)

A sensor for detecting mechanical quantity constituted of a composition of a high sensitivity sensor for detecting mechanical quantity of a first aspect of the invention is a sensor for measuring and detecting a mechanical quantity. Here, the mechanical quantity is preferably constituted of one or more kinds selected from a quantity of strain, displacement, stress, pressure and weight (load).

The quantity of strain, stress and pressure mechanical quantity are more preferable.

The above insulating matrix material becomes a base material in the composition of a high sensitivity sensor for detecting mechanical quantity. This insulating matrix material is constituted of a metal oxide, a metal nitride, or their composite compound.

For example, the insulating matrix material can include an oxide or a nitride and their composite compound or a solid solution formed by one or more kinds of elements selected from aluminum, silicon, magnesium, calcium, chromium, zirconium, yttrium, ytterbium, lanthanum, vanadium, barium, strontium, scandium, boron, hafnium, bismuth, titanium, iron, zinc, niobium, tungsten, cerium, dysprosium, rhenium, lithium, samarium, tantalum, etc.

The insulating matrix material can also include a composite oxide, a composite compound and a solid solution of the above elements. Further, the insulating matrix material can be also constituted of a ceramics material such as sialon, cordierite, mullite, zircon, forsterite, ferrite, spinet, etc.

This insulating matrix material preferably includes a material of higher strength, higher toughness and higher impact resistance in comparison with second phase particles. In this case, it is possible to obtain a composition of a high sensitivity sensor for detecting mechanical quantity having a high strength and an excellent impact resistance.

Usable kinds of a material as the above second phase particles depend on a kind of the insulating matrix material.

For example, when a nitride of silicon, aluminum and boron is utilized as the insulating matrix material, particles formed by one kind or more of a metal carbide, a nitride, a silicide, a sulfide, and a boride, including B, Si, Ti, W, V, Hf, Zr, Zn, Nb, Ta, Cr, Ru, Au, Sn, In, Tl, Ag, Mo, etc., can be used as the second phase particles.

When the insulating matrix material is formed by $Al_2O_3$, particles including one or more kinds of WC, $Mo_3C$, ZrC, W, $TiB_2$, $B_4C$, SiC, $Sn_2O_3$, RuO and $Cu_2O$ can be used as the second phase particles.

When the insulating matrix material is formed by AlN, particles including one or more kinds of $TiB_2$, VB, $ZrB_2$, $CrB_2$, TiN, ZrN, $Cr_2N$, $WSi_2$, $NbSi_2$, $TaSi_2$, etc. can be used as the second phase particles.

The interparticle distance between the second phase particles dispersed into the insulating matrix material ranges from 0.001 to 1 $\mu$m. When the interparticle distance is smaller than 0.001 $\mu$m, it is close to a case in which the second phase particles are continuously dispersed. Therefore, linear strain resistance effects with a high sensitivity may not be obtained. In contrast with this, when the interparticle distance is greater than 1 $\mu$m, the electric conductivity of the composition of a high sensitivity sensor for detecting mechanical quantity is reduced so that the function of the sensor for detecting mechanical quantity may not be obtained.

The above interparticle distance means the distance of a clearance between a certain second phase particle and another second phase particle.

The above interparticle distance can be measured by cutting the composition of a high sensitivity sensor for detecting mechanical quantity and etching a cross section of the composition of this sensor by ECR plasma to observe this cross section by SEM. Otherwise, the above interparticle distance can be measured by TEM-observing a thin piece of the composition of a high sensitivity sensor for detecting mechanical quantity.

(First Aspect of the Invention)

Next, in a first aspect of the invention, the above interparticle distance A is preferably equal to or smaller than half of an interparticle distance B. In this case, effects of the first aspect of the invention can be more reliably obtained.

An insulating matrix material in a composition of a high sensitivity sensor for detecting mechanical quantity in the first aspect of the invention can be constituted of various kinds of substances previously shown as examples. Further, second phase particles can be also constituted of various kinds of substances previously shown as examples.

These details are similar to those in the above-mentioned first aspect of the invention.

(Second Aspect of the Invention)

An insulating matrix material in a composition of a high sensitivity sensor for detecting mechanical quantity in a second aspect of the invention can be constituted of various kinds of substances previously shown as examples. Further, second phase particles can be also constituted of various kinds of substances previously shown as examples.

These details are similar to those in the above-mentioned first aspect of the invention.

(First and Second Aspects of the Invention)

In the above first and second aspects of the invention, it is preferable to set a structure in which a third phase of an insulating property having an elastic modulus smaller than that of the above insulating matrix material is dispersed into the above insulating matrix material and the second phase particles are discontinuously dispersed into this third phase.

Figure 2:
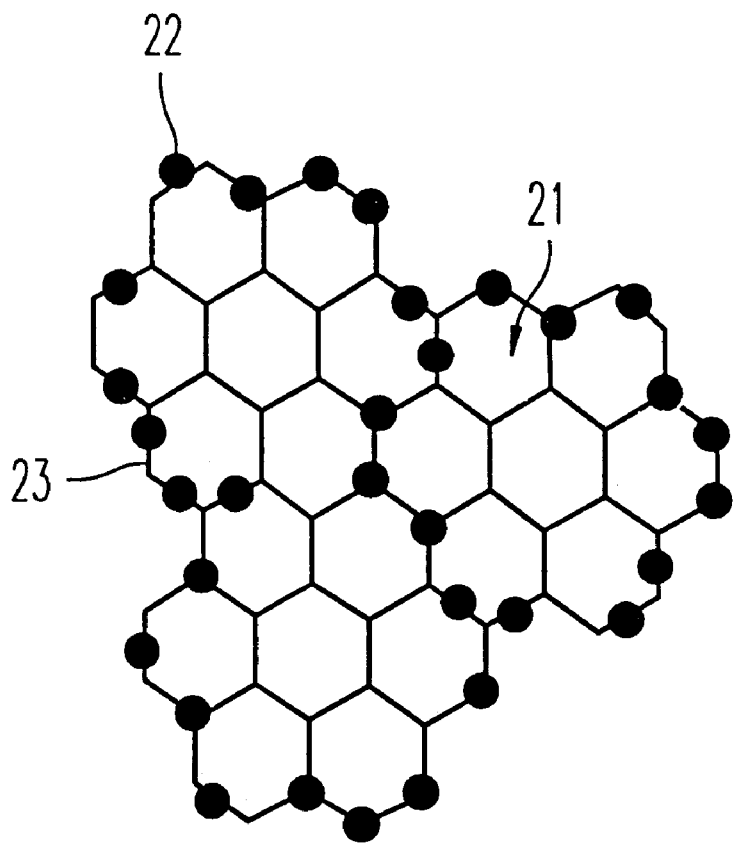
FIG. 2 is a typical explanatory view showing the structure of a hot pressed body in Embodiment 1.

As shown in FIG. 2 described later, effects of the first aspect of the invention can be obtained when the second phase particles are dispersed into crystal particles and/or an intercrystalline phase constituting the insulating matrix material. However, it is more preferable to disperse the second phase particles such that a conductive path is formed in at least the intercrystalline phase of the insulating matrix material.

In each of these cases, the effects of the present invention can be more reliably obtained.

It is also preferable that the above insulating matrix material is porous and has a high porosity in a direction perpendicular to a loading direction of the detected mechanical quantity. In this case, the Poisson's ratio in the perpendicular direction is reduced so that a change in resistance in the perpendicular direction can be reduced. Accordingly, since an electrical resistance changing rate in the loading direction is increased, it is possible to obtain a composition of a high sensitivity sensor for detecting mechanical quantity capable of constituting a sensor with higher sensitivity.

The conductivity path formed by the above second phase particles may be set to be in an isotropic state. However, it is more preferable that the conductive path is in a state in which the conductive path is formed prior to the loading direction of the detected mechanical quantity. In this case, it is possible to obtain a composition capable of efficiently detecting the electrical resistance changing rate by a load of the detected mechanical quantity so that the effects of the present invention can be more reliably obtained.

Various kinds of producing methods of the composition of a high sensitivity sensor for detecting mechanical quantity s in the first and second aspects of the invention will next be shown as examples.

(Producing Method 1)

There is a producing method of a composition of a high sensitivity sensor for detecting mechanical quantity comprising the steps of:

preparing a matrix powder constituted of an insulating material, and second phase particles having a particle diameter ratio equal to or smaller than ½ with respect to this matrix powder and constituted of a conductor or a semiconductor by wet or dry grinding and mixing;

pressurizing the mixing powder from a predetermined direction and molding this mixing powder by using a die so that a molded body is obtained;

obtaining a sintering body by sintering the above molded body while the molded body is pressurized in the same direction as the pressurizing direction to the above mixing powder; and cutting a cutting piece out of the sintering body such that a loading direction of a detected mechanical quantity is parallel to the pressurizing direction in the sintering.

The above matrix powder may be constituted of a raw material powder itself or the granular powder of the raw material powder.

Figure 1B:
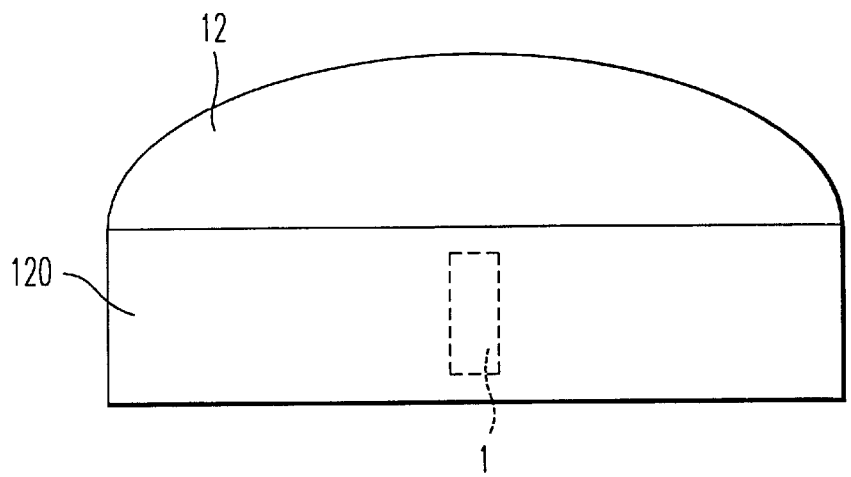
Figure 1C:
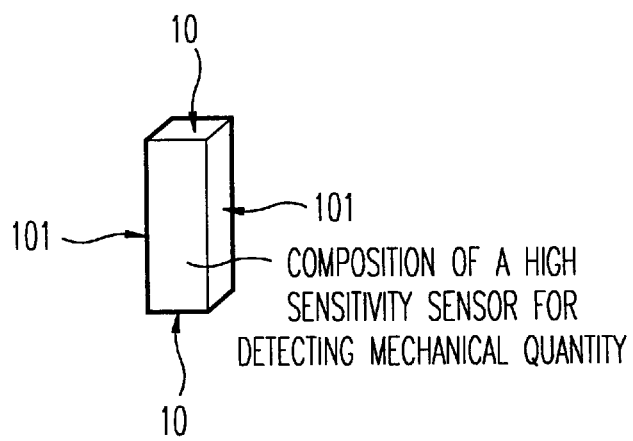

As shown in FIGS. 1A–1C, described later, the cutting piece is cut out of this sintering body such that the loading direction of the detected mechanical quantity is parallel to the pressurizing direction in the sintering. Thus, it is possible to obtain a composition of a high sensitivity sensor for detecting mechanical quantity in the present invention (the cutting piece cut out of the, sintering body becomes the composition of a high sensitivity sensor for detecting mechanical quantity).

A device such as a hot press, a HIP (Hot Isostatic Press), etc. can be used to sinter the molded body while the molded body is pressurized.

(Producing Method 2)

There is a producing method of a composition of a high sensitivity sensor for detecting mechanical quantity comprising the steps of:

making a laminating molded body in which an insulating sheet molded body formed by molding a matrix powder constituted of an insulating material in a sheet shape, and mixing powder formed by mixing second phase particles constituted of a conductor or a semiconductor with the above insulating material, or a second sheet molded body formed by molding the above second phase particles in a sheet shape are laminated with each other;

obtaining a laminating sintering body in which an internal stress is given to the laminating sintering body by sintering the laminating molded body while the laminating molded body is pressurized in a direction perpendicular to a laminating direction; and cutting a cutting piece out of the laminating sintering body such that a loading direction of a detected mechanical quantity is parallel to a pressurizing direction.

For example, the mixing powder constituted of the above second phase particles and the above insulating material is printed to the above insulating sheet molded body by screen printing, etc. while patterns of a stripe and a grid are formed. Thus, a printing body is produced. The laminating molded body can be produced by overlapping a plurality of such printing bodies.

The others are similar to those in the above producing method 1.

(Producing Method 3)

There is a producing method of a composition of a high sensitivity sensor for detecting mechanical quantity comprising the steps of:

preparing a matrix powder constituted of an insulating material, and second phase particles having a particle diameter ratio equal to or smaller than ½ with respect to this matrix powder and constituted of a conductor or a semiconductor;

kneading the above matrix powder and the above second phase particles after adding a binder to the matrix powder and the second phase particles;

making a core-shaped molded body having a conductive path discontinuously dispersing the second phase particles thereinto by extrusion-molding the kneading substance;

making a columnar molded body having a cylindrical shape, a rectangular parallelepiped shape, etc. by again applying a uniaxial press pressure to the core-shaped molded body in its longitudinal direction together with the matrix powder constituted of the insulating material;

a process for obtaining a columnar sintering body by sintering the columnar molded body while the columnar molded body is pressurized in its longitudinal direction; and a process for cutting a cutting piece out of the columnar sintering body in a direction parallel to the longitudinal direction of the columnar sintering body.

In accordance with each of the above producing methods 1 to 3, the composition of a high sensitivity sensor for detecting mechanical quantity in the present invention comprises an insulating matrix material and a conductive path constituted of discontinuously dispersing the second phase particles into this insulating matrix material at an interparticle distance from 0.001 to 1 $\mu$m.

Further, it is similarly possible to easily obtain a composition of a high sensitivity sensor for detecting mechanical quantity in which the distance A between the second phase particles in the loading direction of the detected mechanical quantity is shorter than the distance B between the second phase particles in a direction perpendicular to this loading direction.

Further, it is possible to easily obtain a composition of a high sensitivity sensor for detecting mechanical quantity in which crystal particles constituting the above insulating matrix are oriented or aligned in the loading direction of the detected mechanical quantity.

The composition of a high sensitivity sensor for detecting mechanical quantity in the present invention can be also obtained by a producing method other than the above producing methods.

In the above producing methods crystal particles constituting the insulating matrix material can be oriented or aligned in one or two directions by adopting a method in which columnar crystal particles are used as matrix powder, etc.. In embodiments, axes of columnar crystal particles can be oriented substantially parallel to a loading direction of a mechanical quantity.

Thus, the distance between the second phase particles can be changed so that the sensitivity of a sensor made by this material can be adjusted.

EMBODIMENTS

Embodiment 1

A composition of a high sensitivity sensor for detecting mechanical quantity in an embodiment of the present invention and its producing method will next be explained with reference to FIGS. 1A–3. Samples 1–6 in this embodiment will be also explained together with Comparative Samples C1–C2 with respect to performance of this composition of a high sensitivity sensor for detecting mechanical quantity.

The composition of a high sensitivity sensor for detecting mechanical quantity in this Embodiment is also constituted of an insulating matrix material and a conductive path constituted of discontinuously dispersing second phase particles formed by a conductor or a semiconductor into the insulating matrix material at an interparticle distance from 0.001 to 1 $\mu$m. Further, in the composition of a high sensitivity sensor for detecting mechanical quantity, the distance A between the second phase particles in a loading direction of a detected mechanical quantity is smaller than the distance B between the second phase particles in a direction perpendicular to this loading direction. This composition of a high sensitivity sensor for detecting mechanical quantity functions as a high sensitivity sensor for detecting mechanical quantity capable of detecting the loaded detected mechanical quantity (Sample 6 Described Later).

The composition of a high sensitivity sensor for detecting mechanical quantity in this example is also constituted of an insulating matrix material and a conductive path constituted of discontinuously dispersing second phase particles formed by a conductor or a semiconductor into the insulating matrix material at an interparticle distance from 0.001 to 1 $\mu$m. Further, in the composition of a high sensitivity sensor for detecting mechanical quantity, crystal particles constituting the above insulating matrix are oriented in a loading direction of a detected mechanical quantity. This composition of a high sensitivity sensor for detecting mechanical quantity functions as a high sensitivity sensor for detecting mechanical quantity capable of detecting the loaded detected mechanical quantity (Sample 7 described later).

Producing methods of Samples 1–7 in this embodiment and Comparative Samples C1–C2 will be explained.

<Sample 1>

94 wt % of $Si_3N_4$ (average particle diameter: 0.2 Mm), 6 wt % of $Y_2O_3$, PVA (polyvinyl alcohol) as a binder, and a dispersion stabilizer are mixed by wet grinding and mixing in a ball mill and granular powder having about 100 $\mu$m in particle diameter is made by a spray dryer. Here, $Si_3N$, is matrix powder for an insulating matrix material and $Y_2O_3$ is a sintering assistant agent.

90 wt % of the above granular powder and 10 wt % of SiC (average particle diameter: 0.4 $\mu$m) are mixed by wet mixing and grinding and are set to 100 wt %. This mixed material is dried, degreased and molded. Here, SiC is second powder constituting second phase particles.

As shown in FIG. 1A, a molded body 11 having a disc shape and 60 mm in diameter and 10 mm in thickness is obtained by the above molding. This molded body 11 is hot-pressed for one hour in a condition of 1850 $\mu$C in temperature and 20 MPa in press pressure.

As shown in FIG. 1B, a cutting piece 1 is cut out of the obtained hot pressed body 12 such that the direction of a detected mechanical quantity is parallel to a direction of the press pressure applied in the hot press as shown in FIG. 1C. As shown in FIG. 1C, this cutting piece 1 is a composition of a high sensitivity sensor for detecting mechanical quantity 1 in this embodiment (Sample 1).

A cutting cross section 120 of the hot pressed body 12 provided by cutting the above sample 1 is ECR-plasma-etched and its etching portion is SEM-observed. As a result, as shown in FIG. 2, it is confirmed that a cell wall stricture is formed in the above hot pressed body 12 such that peripheral portions of plural $Si_3N_4$ crystal particles 21 are surrounded by SiC particles 22. In this figure, reference numeral 23 designates an intercrystalline phase.

Thus, it has become clear that the above Sample 1 has a structure in which SiC as the second phase particles is discontinuously dispersed into $Si_3N_4$ as the insulating matrix material at an interparticle distance from 0.001 to 1 $\mu$m.

<Samples 2 and 3>

64 wt % of $Si_3N_4$ (average particle diameter: 0.2 $\mu$m), 6 Wt % Of $Y_2O_3$, 30 wt % of SiC (average particle diameter: 0.01 to 0.03 $\mu$m, specific surface area: 48 m$^2$/g) are mixed by wet grinding and mixing in a ball mill and are dried so that mixing raw material powder is obtained.

This mixing raw material powder is uniaxial pressed and molded at a pressure of 20 MPa. Thereafter, these molded materials are hot-pressed for one hour at a press pressure of 20 mPa or 30 MPa and at a temperature of 1850° C. (in $N_2$)

Cutting pieces are cut out of these obtained hot pressed bodies such that a loading direction of a detected mechanical quantity is parallel to a hot pressing direction (see FIG. 1B). These cutting pieces become a composition of a high sensitivity sensor for detecting mechanical quantity of each of Sample 2 (press pressure 20 MPa) and Sample 3 (press pressure 30 MPa).

A cross section of the hot pressed body is ECR-plasma-etched by a method similar to that with respect to Sample 1 and its etching portion is SEM-observed. As a result, as shown in FIG. 2, it is confirmed that a cell wall structure is formed in the above hot pressed body 12 such that peripheral portions of plural $Si_3N_4$ crystal particles are surrounded by SiC particles.

<Sample 4>

64 wt % of $Si_3N_4$ (average particle diameter: 0.8 $\mu$m), 6 wt % of $Y_2O_3$, 30 wt % of TiN (average particle diameter: 0.4 $\mu$m, specific surface area: 18 m$^2$/g ) are mixed by wet grinding and mixing in a ball mill and are dried so that mixing raw material powder is obtained. Here, TiN constitutes second phase particles.

This mixing raw material powder is uniaxial pressed and molded at a pressure of 20 MPa. Thereafter, this molded material is hot-pressed for one hour at a press pressure of 20 MPa and a temperature of 1850° C. ($N_2$) as a condition.

A cutting piece is cut out of this obtained hot pressed body such that a loading direction of a detected mechanical quantity is parallel to a hot press direction (see FIG. 1B). This cutting piece becomes a composition of a high sensitivity sensor for detecting mechanical quantity of Sample 4.

A cross section of this hot pressed body is ECR-plasma-etched by a method similar to that of Sample 1 and its etching portion is SEM-observed. As a result, it is confirmed that a cell wall structure is formed in the above hot pressed body such that peripheral portions of plural $Si_3N_4$ crystal particles are surrounded by TiN particles (see FIG. 2).

<Sample 5>

54 wt % of $Si_3N_4$ raw material powder having 0.2 μm in particle diameter, 6 wt % of $Y_2O_3$ raw material powder, and 40 wt % of SiC raw material powder having an average particle diameter from 0.01 to 0.03 μm (specific surface area is 48 m$^2$/g) are mixed by wet grinding and mixing in a ball mill and are then dried so that mixing powder is obtained.

This mixing powder is molded by a die and is then hot-pressed for one hour at a temperature of 1850° C. and a press pressure of 20 MPa as a condition. A cutting piece is cut out of this hot pressed body such that a loading direction of a detected mechanical quantity is parallel to a hot press direction (see FIG. 1B). This cutting piece becomes a composition of a high sensitivity sensor for detecting mechanical quantity of Sample 5.

A cross section of this hot pressed body is ECR-plasma-etched by a method similar to that of Sample 1 and its etching portion is SEM-observed. As a result, it is confirmed that a cell wall structure is formed in the above hot pressed body such that peripheral portions of plural $Si_3N_4$ crystal particles are surrounded by SiC particles (see FIG. 2).

<Sample 6>

60 wt % of $Si_3N_4$ raw material powder having 1 μm in particle diameter (specific surface area: 4 m$^2$/g), 5 wt % of $Y_2O_3$ raw material powder, 5 wt % of $MgAlO_2$ raw material powder and 30 wt % of SiC raw material powder having 0.3 μm in average particle diameter (specific surface area is 21 m$^2$/g) are mixed by wet grinding and mixing in a ball mill and are then dried so that mixing powder is obtained.

This mixing powder is molded by a die and is precalcinated for one hour at a temperature of 1600° C and a pressure of 20 MPa as a condition. Thereafter, this calcinated material is hot-pressed for one hour at a temperature of 1850° C and a pressure of 20 MPa as a condition. A cutting piece is cut out of this hot pressed body such that a loading direction of a detected mechanical quantity is parallel to a hot press direction (see FIG. 1B). This cutting piece becomes a composition of a high sensitivity sensor for detecting mechanical quantity of Sample 6.

A cross section of this hot pressed body is ECR-plasma-etched by a method similar to that of Sample 1 and its etching portion is SEM-observed. As a result, it has become clear that a cell wall structure is formed in the above hot pressed body such that peripheral portions of plural $Si_3N_4$ crystal particles having a large aspect ratio are surrounded by SiC particles (see FIG. 2). Further, it is confirmed that the distance between the SiC particles in the press direction is smaller than that in a direction perpendicular to the press direction.

<Sample 7>

6 wt % of $Y_2O_3$ and 30 wt % of SiC particles are mixed by wet grinding and mixing with 74 wt % of columnar crystal $Si_3N_4$ powder in a ball mill so that a slurry is made. This slurry is formed in the shape of a thick film having about 50 μm in thickness by using a doctor bladend is dried.

The dried thick film body is laminated and hot-pressed for one hour at a temperature of 1850° C and a pressure of 20 MPa as a condition. Then, similar to the sample 6, a cutting piece is cut out of the film body and is set to a composition of a high sensitivity sensor for detecting mechanical quantity of Sample 7.

<Comparative Sample C1>

74 wt % of $Si_3N_4$ (average particle diameter; 0.5 μm), 6 wt % of $Y_2O_3$ and 20 wt % of SiC (average particle diameter; 0.7 μm) are mixed by wet grinding and mixing with each other in a ball mill and are dried and molded. Further, the molded material is hot-pressed so that a hot pressed body is obtained. A cutting piece is cut out of this hot pressed body and is set to Comparative Sample C1.

A cross section of this hot pressed body is ECR-plasma-etched by a method similar to that of Sample 1 and its etching portion is SEM-observed. As a result, in this hot pressed body, SiC particles are uniformly dispersed into crystal particles of $Si_3N_4$.

<Comparative Sample C2>

Comparative Sample C2 is produced by molding and sintering semiconductor silicon. This Comparative Sample C2 is conventionally used as a composition of a sensor for detecting mechanical quantity.

<Performance Evaluating Test>

With respect to composition of a high sensitivity sensor for detecting mechanical quantity s in Samples 1–7 and Comparative Samples C1–C2, gold (Au) is evaporated on both end faces of these composition of a high sensitivity sensor for detecting mechanical quantity s and these comparative samples. Further, a change in electrical resistance value is examined by using a two-terminal method when compression stress is loaded to these materials and samples. From these results, a specific resistance value are derived and described in Table 1.

TABLE 1

| | Specific Resistance (Ωcm) |
|---|---|
| Sample 1 | 20 |
| Sample 2 | 9 × 10$^2$ |
| Sample 3 | 4 × 10$^2$ |
| Sample 4 | 3 × 10$^{-3}$ |
| Sample 5 | 2 × 10$^2$ |
| Sample 6 | 5 |
| Sample 7 | 2 |
| Comparative Sample C1 | 4 × 10$^8$ |
| Comparative Sample C2 | 0.1 |

Figure 3:
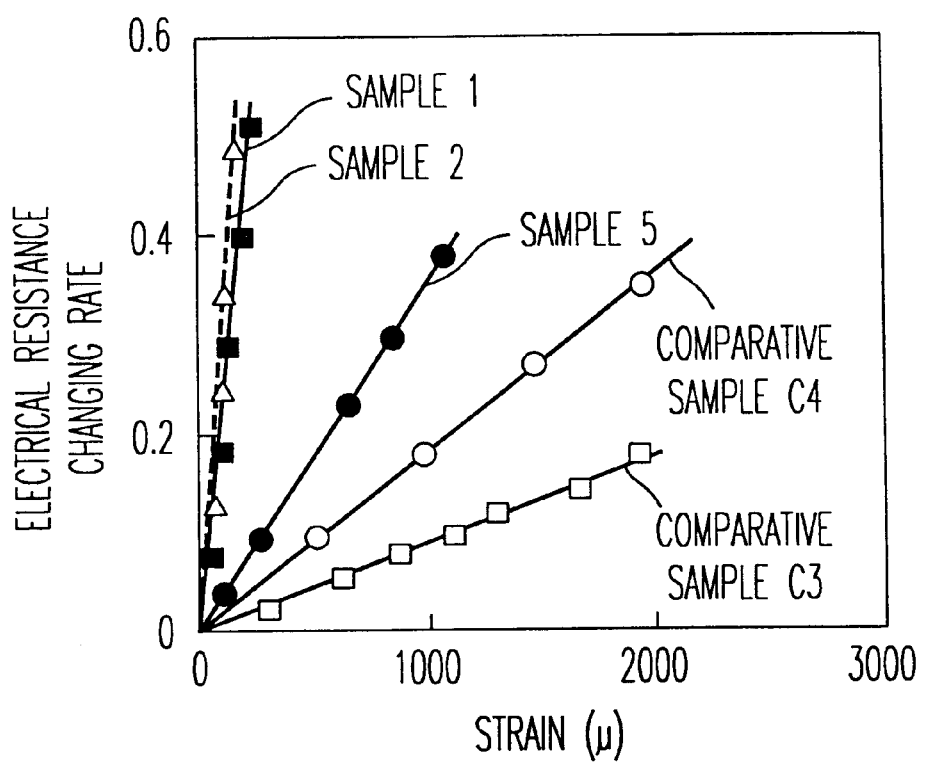
FIG. 3 is a graphic representation showing the relation of strain of each of Sample 5 and Comparative Sample C2 and its resistance changing rate in Embodiment 1.

Further, with respect to Sample 5 and Comparative Sample C2, a graphic representation showing the relation of strain and a resistance changing rate is described in FIG. 3.

As can be clearly seen from FIG. 3, Sample 5 has resistance of strain effects in which the resistance changing rate is linearly changed from small strain to large strain.

In contrast to the Samples 1–7 in this example, the Comparative Sample C1 having SiC as the second phase particles uniformly dispersed into the insulating matrix material has a very large specific resistance value and no electric conductivity of the Comparative Sample C1 is recognized as shown in the Table 1. Therefore, Comparative Sample C1 can not be used as a composition of a high sensitivity sensor for detecting mechanical quantity.

In contrast to this, it is recognized that Comparative Sample C2 constituted of the silicon semiconductor has linear strain resistance effects. Accordingly, this Comparative Sample C2 functions as a composition of a sensor for detecting mechanical quantity. However, it has become clear that Comparative Sample C2 is not preferable as a material for obtaining a high sensitivity sensor for detecting mechanical quantity.

Having thus described the invention in detail, it will be understood that these details need not be strictly adhered to, but that various changes or modifications may suggest themselves to those skilled in the art, all falling within the scope of the invention as defined by the claims.

The disclosure of the priority document Application No. 10-020275, which was filed in Japan on Jan. 16, 1998, is incorporated by reference herein in its entirety.

What is claimed is:

1. A composition that can be included in a high sensitivity sensor for detecting a mechanical quantity, the composition comprising:
   an insulating matrix material;
   a conductive path including second phase particles of a conductor or a semiconductor dispersed discontinuously in the insulating matrix material at an interparticle distance of from 0.001 to 1 μm, wherein
   an average distance A between the second phase particles parallel to the loading direction is smaller than an average distance B between the second phase particles perpendicular to the loading direction.

2. The composition according to claim 1, wherein the insulating matrix material comprises at least one element selected from a group consisting of aluminum, silicon, magnesium, calcium, chromium, zirconium, yttrium, ytterbium, lanthanum, vanadium, barium, strontium, scandium, boron, hafnium, bismuth, titanium, iron, zinc, niobium, tungsten, cerium, dysprosium, rhenium, lithium, samarium and tantalum.

3. The composition according to claim 1, wherein
   the insulating matrix material comprises a nitride including an element selected from a group consisting of silicon, aluminum and boron; and
   the second phase particles comprise at least one compound selected from a group consisting of carbides, nitrides, silicides, sulfides and borides, wherein the at least one compound includes an elected selected from a group consisting of B, Si, Ti, W, V, Hf, Zr, Zn, Nb, Ta, Cr, Ru, Au, Sn, In, Tl, Ag and Mo.

4. The composition according to claim 1, wherein
   the insulating matrix material comprises $Al_2O_3$; and
   the second phase particles comprise at least one compound selected from a group consisting of WC, $Mo_3C$, ZrC, W, $TiB_2$, BC, SiC, $Sn_2O_3$, RuO and $Cu_2O$.

5. The composition according to claim 1, wherein
   the insulating matrix material comprises AlN; and
   the second phase particles comprise at least one compound selected from a group consisting of $TiB_2$, VB, $ZrB_2$, $CrB_2$, TiN, ZrN, $Cr_2N$, $WSi_2$, $NbSi_2$ and $TaSi_2$.

6. The composition according to claim 1, wherein the average distance A is less than or equal to half of the average distance B.

7. The composition according to claim 1, further comprising a third phase dispersed in the insulating matrix material, wherein
   the third phase is an insulating material having an elastic modulus smaller than an elastic modulus of the insulating matrix material; and
   the second phase particles are dispersed discontinuously in the third phase.

8. The composition according to claim 1, wherein the insulating matrix material is more porous in a direction perpendicular to the loading direction than in a direction parallel to the loading direction.

9. A method for detecting a mechanical quantity, the method comprising examining an electrical resistance of the composition of claim 1.

* * * * *